United States Patent
Stilwell et al.

[19]

[11] Patent Number: 6,137,773
[45] Date of Patent: *Oct. 24, 2000

[54] METHOD AND APPARATUS FOR CDMA CODE DOMAIN PARAMETER ESTIMATION

[75] Inventors: James Howard Stilwell, Mesa; Thomas Russell Vitale, Scottsdale; Lonnie Matthew Smith, Fountain Hills, all of Ariz.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/823,091

[22] Filed: Mar. 24, 1997

[51] Int. Cl.[7] ................................. H04J 13/00
[52] U.S. Cl. ................... 370/209; 370/252; 375/208
[58] Field of Search .................... 370/208, 209, 370/241, 252, 320, 335, 342, 479; 375/200, 206, 208, 209, 210

[56] References Cited

U.S. PATENT DOCUMENTS

| | | | |
|---|---|---|---|
| 5,412,686 | 5/1995 | Ling | 375/200 |
| 5,577,025 | 11/1996 | Skinner et al. | 370/209 |
| 5,712,869 | 1/1998 | Lee et al. | 370/209 |

OTHER PUBLICATIONS

R.A. Birgenheier, "Measuring Waveform Quality, Code-domain Power, Time Offsets and Phase Offsets of CDMA Signals", IEEE Conference, Jun. 4, 1996.

An article entitled "Overview of Code–Domain Power, Timing, and Phase Measurements", by Raymond A. Birgenheier from Feb. 1996 Hewlett–Packard Journal, (Feb. 1996).

*Primary Examiner*—Min Jung
*Attorney, Agent, or Firm*—Bradley J. Botsch; Dana B. LeMoine

[57] ABSTRACT

The testing and verification of CDMA cellular base stations requires a number of parameters to be measured. Many of these parameters are measured in the code domain where individual waveforms are extracted from a composite waveform through the use of orthogonal codes. A method and apparatus is described for measuring many code domain parameters using a modified code domain power measurement technique. The apparatus is comprised of a chip timing recovery circuit (46), a reference generator (78), a multiplier (60), various summers and absolute value operations, a memory (76), and a processor (90). In addition, a reference generator (78) for generating an improved reference waveform is described. Reference generator (78) is comprised of a Walsh code generator (200), an I channel PN sequence generator (202), a Q channel PN sequence generator (204), an XOR gate (206), and an XOR gate (208). This improved reference waveform allows for greater code domain parameter measurement accuracy without requiring tighter input frequency tolerances.

39 Claims, 5 Drawing Sheets

METHOD AND APPARATUS FOR CDMA CODE DOMAIN PARAMETER ESTIMATION

TECHNICAL FIELD

This invention relates generally to digital cellular communications systems and, in particular, to methods and systems for the testing of CDMA cellular base station telephone equipment.

BACKGROUND OF THE INVENTION

Cellular communications have become widespread in recent years. As spread-spectrum code division multiple access (CDMA) systems become more prevalent in today's cellular systems, a need has arisen to provide test equipment for the CDMA cellular base station telephone equipment.

The testing of CDMA base station telephone equipment is specified in the Telecommunication Industry Association (TIA) Interim Standard 97 (IS-97). Among the tests specified by IS-97 are a class of parameters designed to measure what is hereinafter referred to as the CDMA base station "waveform quality." These waveform quality parameters provide a characterization of the code domain channels of a CDMA base station transmitter. One measurement, code domain power, is used to measure the distribution of power among code channels. Other measurements such as code domain timing and code domain phase, reflect timing and phase errors of code channels relative to the pilot channel. These measurements are important because subscriber units make all measurements of code channels based on timing and phase of the received pilot channel. IS-97 provides for maximum offsets in phase and timing to guarantee that subscriber units will function satisfactorily.

Within IS-97, it is suggested that the waveform quality parameters be measured using certain computationally complex algorithms. Specifically, IS-97 suggests that a large number of simultaneous equations be solved continuously during the measurement process. The continuous solving of a large number of simultaneous equations is costly in terms processing power and time. It is desirable, therefore, to reduce or eliminate the need for simultaneous equation solving, thereby reducing the hardware and time required to perform the measurements.

Further, it is recognized in the art that measurement accuracy can be substantially increased by increasing the length of a correlation in the suggested algorithm as presented in IS-97. It is also well recognized in the art that as the correlation length is increased, the frequency offset of the input signal must be controlled more tightly to minimize the phase rotation during any one correlation time. It is desirable, therefore, to be able to increase measurement accuracy by increasing the correlation time without necessitating tighter input frequency control.

Hence, there exists a need for an apparatus and method for measuring CDMA base station waveform quality parameters which is both computationally simpler and faster than current approaches as known in the art.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE DRAWINGS

As mentioned earlier, the testing of CDMA base station equipment is specified in the industry standard TIA-IS-97. TIA-IS-97 is incorporated by reference herein.

Specifically, IS-97 specifies the following equation for the measurement of code domain power:

$$P_i = \frac{\sum_{j=1}^{N} \left| \sum_{k=1}^{64} Z_{j,k} R^*_{i,j,k} \right|^2}{\left[ \sum_{k=1}^{64} |R^*_{i,j,k}|^2 \right] \left[ \sum_{j=1}^{N} \sum_{k=1}^{64} |Z|^2 R^*_{j,k} \right]}$$

The code domain power equation as shown above represents the power in an individual CDMA channel divided by the total power measured at the sampling time. When i=0, the equation measures $\rho_o$ or the power in the pilot channel. For i=1 to 63, the power equation measures $\rho_i$, the code domain power for the i-th Walsh channel. The numerator includes the term Z, which represents a sampled version of the composite CDMA waveform at baseband, and R*, which represents the complex conjugate of a reference waveform that is made up of the Walsh code, and the short Pseudo Noise (PN) code. Z and R* are correlated together over the Walsh period of 64 chips. The resulting summation is squared which then yields power for a given i-th CDMA channel. That power value is then summed over a plurality of Walsh periods. IS-97 specifies a minimum of 20 such periods, and the preferred embodiment described herein uses a value of 256, but it will be readily apparent to one skilled in the art that any value could be substituted while still practicing the present invention.

The denominator of the code domain power equation, which represents the total power measured at the sampling time, includes the power of the incoming composite CDMA waveform, Z, summed over the 64 chips of a single Walsh period and then summed over the same number of Walsh periods as used in the numerator. Also in the denominator is the power of the reference waveform summed over the 64 chips in a single Walsh period.

It should be noted that the code domain power equation assumes that proper timing has been established. For Z and R* to correlate correctly in the numerator of the equation, the short code as used in the reference generator must match the short code and offset as present in the incoming composite waveform. In addition to the short code, the Walsh code must be aligned at a period boundary. In addition to this coarse timing of codes, the sample timing within a chip interval must also be correct.

The present invention recognizes that the hardware that determines the numerator of the code domain power equation can also be utilized to calculate $\Delta f_o$, $\tau_o$, $\phi_o$, $\Delta\tau_i$, and $\Delta\phi_i$, as will be defined and discussed shortly. The measurement techniques practiced in the present invention take advantage of the complex correlation as present in the numerator of the code domain power equation.

$\Delta f_o$ is the frequency error of the composite CDMA signal. By definition all code domain channels, including the pilot, are at the same carrier frequency. $\Delta f_o$ can be determined by taking the phase difference of the pilot channel at two different times. The phase of a channel is calculated as discussed in detail below.

$\tau f_o$ is the pilot timing relative to the 2 second CDMA base station timing reference. The coarse timing, more than 1 chip time, is determined by looking at the correlation between the reference (R*) and composite CDMA input signal (Z). The reference signal is time shifted 1 chip at a time until the correlation process indicates that the reference and composite input signal are timed within 1 chip period. Once the coarse timing is determined within 1 chip time, fine timing, for example, $\frac{1}{64}_{th}$ chip, is established between the composite input signal and the reference signal shifted by ±½ chip time. This technique is well established in literature and is often referred to as "early-late gate". It will be shown that the coarse and fine timing algorithms use the Z·R* correlation function as found in the numerator of the code domain power equation.

$\Delta\tau_i$ is the Walsh code domain time offset relative to the pilot for the i-th code channel. $\Delta\tau_i$ is defined as $\tau_i-\tau_o$. The timing offset of $\tau_i$ is calculated identically to $\tau_o$ except that the correlation reference signal is the i-th channel, where i is between 1 and 63, rather than the 0-th, or pilot channel.

$\Delta\phi_i$ is the Walsh code domain phase offset of the i-th channel relative to the 0-th, or pilot channel. $\Delta\phi_i$ is defined as $\phi_i-\phi_o$. The present invention recognizes that an important aspect to determining $\phi_o$ or $\phi_i$ is to recognize that the phase between two complex pseudo-random codes can be determined by correlating the two complex signals. In the case at hand, one of the pseudo-random signals is that of the i-th channel code, while the other signal is that of the composite CDMA signal.

The present invention further simplifies the task of measuring the waveform quality parameters by greatly simplifying the generation of the required reference waveform. One known method for generating a reference signal is to use a closed loop system wherein a search procedure which minimizes the mean square difference between the base band test signal and a synthesized reference signal is performed. This generally requires a two step process wherein the data contained in Z is demodulated and then the reference signal R is constructed. After R is constructed, a large number of simultaneous equations is solved to minimize the error between Z and R. This method is costly and time consuming. The present invention recognizes that this complex method of generating a reference signal is not necessary. The present invention implements a method whereby the data in the input waveform Z is not needed, so that the demodulating step is obviated. Further, the present invention implements a method whereby the reference R consists solely of positive and negative 1's thereby simplifying the complex multiplications, Z·R*.

Other approaches to measuring code domain parameters require the synthesizing of this rather complex reference signal because the resultant timing and phase of the synthesized reference relates directly to the measurements to be made. Because the present invention measures all of the code domain parameters using a variation of the code domain power equation, the need for synthesizing the complex reference is obviated. There are other advantages to using this simplified reference as will be explained below in conjunction with the drawings.

Figure 1:
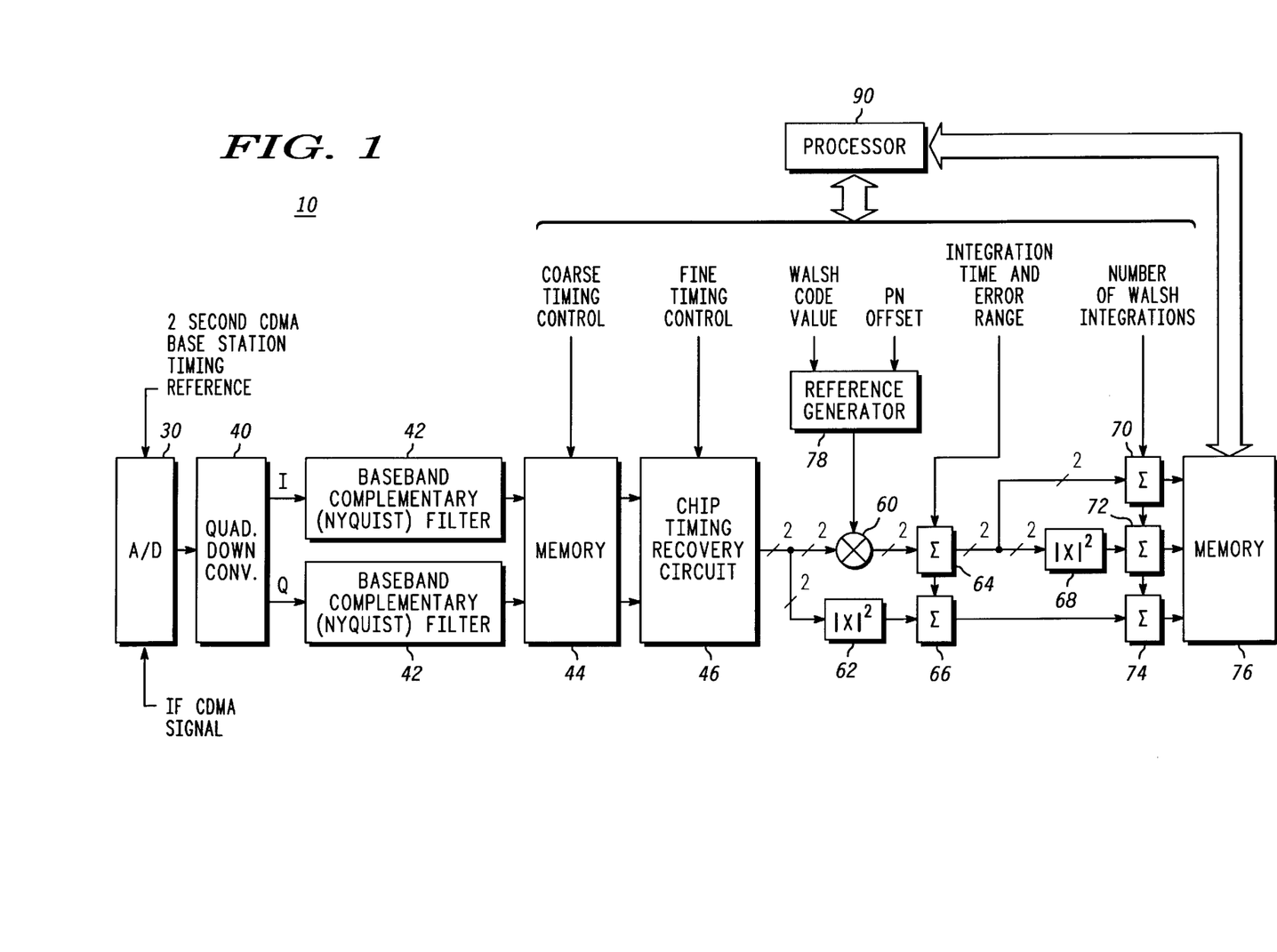
FIG. 1 shows an overview diagram of a system for CDMA code domain parameter estimation in accordance with the present invention.

Now, referring to FIG. 1, there is shown a system for the estimation of CDMA code domain parameters, generally designated by reference number 10. An A/D 30 is shown receiving an incoming composite CDMA signal at an intermediate frequency (IF). The start of the analog to digital conversion process is triggered by the two second timing reference put out by the base station. A/D 30 outputs digitized IF samples which are inputs to quadrature down converter 40. Quadrature down converter 40 uses techniques well-known in the art to bring the digitized IF samples down to baseband samples represented by I and Q. Baseband samples I and Q are input to baseband complementary nyquist filters 42. Nyquist filtering is also well-known in the art. I and Q samples output from the baseband complementary nyquist filters 42 are then stored in memory 44.

The foregoing discussion describes a method for converting a composite CDMA signal at an intermediate frequency to a digitized, down converted, and filtered version. There are many ways to accomplish the same task, and those skilled in the art will recognize that any of many alternate architectures could be used for the conversion while still practicing the present invention.

Memory 44, then, has as contents a burst of samples which start at the two second trigger event and continue in time for a number of samples. Any size memory can be used for memory 44; a larger memory allows for more time data to be stored. The A/D clock and the clocks running the quadrature down converter 40 and baseband complementary nyquist filters 42 are such that the digitized information stored in memory 44 is comprised of two complex samples per chip. It will be readily apparent to one skilled in the art that more or less than two complex samples per chip could be substituted. Once memory 44 has acquired a frame of baseband I and Q data at two complex samples per chip, the acquisition process can be considered complete. Memory 44 is configured such that the contents representing I and Q baseband samples at two complex samples per chip can be repeatedly output to stimulate the remaining blocks shown in FIG. 1 an indeterminate number of times. This allows for a number of measurements to be made very rapidly with a single set of acquired data.

Memory 44 has, as an input, a coarse timing control word. This coarse timing control word serves as an offset into the memory so that a different portion of the memory's contents will stimulate the remaining blocks. By modifying the coarse timing control word, the short code and the Walsh code can be time aligned with that of the reference generator.

The coarse timing control word is shown in FIG. 1 as being provided by processor 90. Other control words are shown in FIG. 1 as being supplied by processor 90, and memories are shown as being accessible by processor 90. Processor 90 represents a processor means well known in the art, and could conceivably be comprised of a DSP, microcontroller, general purpose processor, or the like. Processor 90 could also be comprised of dedicated hardware, thereby increasing the speed. The particulars of this processor are not important to the present invention.

When I and Q baseband samples at two complex samples per chip are output from memory 44, they are input to chip timing recovery circuit 46. The function of the chip timing recovery circuit 46 is to interpolate and to provide one of 64 possible values within a chip period. Because all 64 intra-chip samples are not required at the output of chip timing recovery circuit 46, the chip timing recovery circuit 46 may include dual 8 tap FIR filters, which are single legs of a 256 tap polyphase FIR filter. The output of chip timing recovery circuit 46 is one complex baseband sample per chip, properly timed. The selection of the correct FIR filter coefficients which reside within the chip timing recovery circuit 46 is accomplished via the fine timing control information provided to chip timing recovery circuit 46. It will be recognized by one skilled in the art that through manipulation of fine timing control input to chip timing recovery circuit 46, different intra-chip timing values can be presented at the output of chip timing recovery circuit 46. Of course, there are other methods available to interpolate and recover intra-chip values, including methods that would generate an arbitrarily large number of possible values within a chip. Those methods are intended to be included within the scope of the present invention.

The I and Q outputs from the chip timing recovery circuit 46 are then input as a multiplicand to complex multiplier 60. Complex multiplier 60 also has as a multiplicand the output of reference generator 78. The output of reference generator 78 is the I and Q representation of the ideal reference after going through the cascaded transmit and complementary receiver filters which should give zero intersymbol interference (ISI) at the decision point. The present invention recognizes that if samples are taken at the correct time, so that the intra-chip samples are timed correctly, then the reference generator 78 output need only consist of positive 1's and negative 1's. When reference generator 78 has output consisting solely of positive and negative 1's, multiplier 60 becomes a much simpler block as will be explained later. Output of reference generator 78 is represented by R* in the numerator and denominator of the code domain power equation. Reference generator 78 is shown in more detail in FIG. 2.

Figure 2:
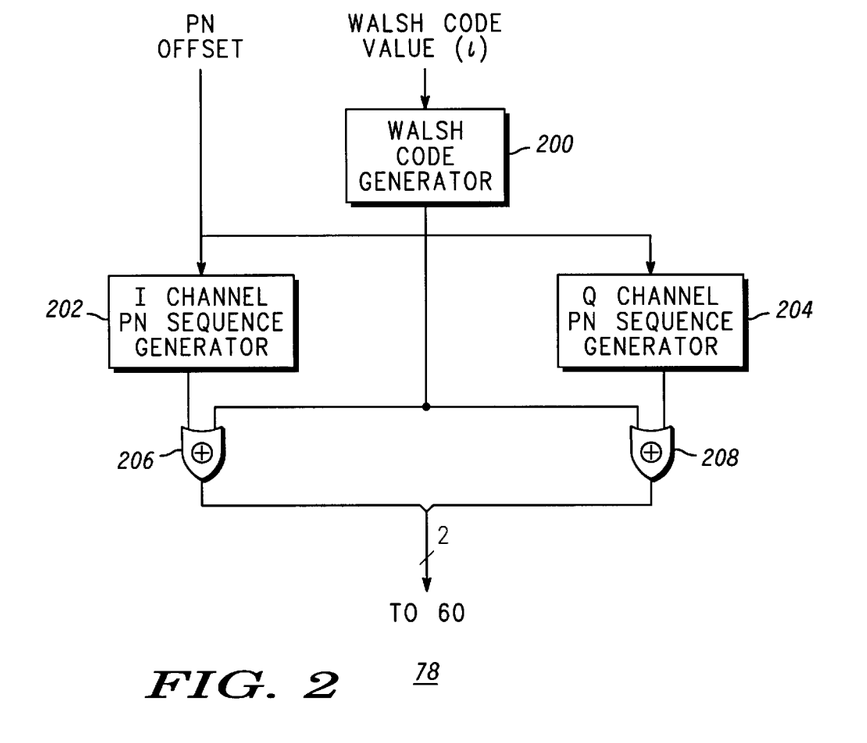
FIG. 2 shows a diagram of a reference signal generator in accordance with one aspect of the present invention.

Referring now to FIG. 2, the internals of reference generator 78 are shown. Reference generator 78 has as inputs the Walsh code value, i, which specifies which of 64 possible Walsh codes are to be used in the generation of the reference, and a PN offset value which specifies an offset into the short code. Walsh code generator 200 outputs the Walsh code as specified by the Walsh code value and the Walsh code is then input to exclusive-OR (XOR) gates 206 and 208. I channel PN sequence generator 202 receives the PN offset value and generates a PN code for the I channel and outputs it to XOR gate 206 where the PN code for the I channel is combined with the Walsh code to produce the I channel reference signal which is a part of the reference generator 78 output. Q channel PN sequence generator 204 takes PN offset as input and generates a PN sequence corresponding to the Q channel and outputs that to XOR gate 208 which then combines the Q PN sequence with the Walsh code to generate the Q channel reference signal which is a part of reference generator 78 output. The PN offset is used to distinguish from one base station to the next. There are 512 possible offset values into the short code, allowing 512 base stations to be orthogonal to each other. The Walsh code has 64 possible values and serves to provide orthogonality between users of the same base station.

From the discussion in the previous paragraph, it can be seen that the reference generator of the present invention is substantially simpler than any reference generator capable of generating a reference signal using a minimized sum-squared-error technique. One advantageous aspect of the reference generator of the present invention is that it requires no knowledge of the data in the CDMA waveform being measured. This reference which contains no data is termed a dataless reference and the reference generator which generates this reference is termed a dataless reference generator. The dataless reference generator of the present invention is advantageous because the implementation is smaller, faster, and consumes less power than other known approaches.

Referring back to FIG. 1, the output of reference generator 78 is a multiplicand for multiplier 60. Because reference values output from reference generator 78 consist solely of positive 1's and negative 1's which can be represented by binary values, multiplier 60 is reduced to a conditional negation operation. One skilled in the art will recognize that this simplification is of great benefit in a hardware implementation.

The output of multiplier 60, then, is Z multiplied by R which forms the basis for the numerator of the code domain power equation. As shown in the code domain power equation, the product of Z and R* is summed over 64 chips of a Walsh code which constitutes a single Walsh code period. Block 64 in FIG. 1 shows a summing operation which performs this summation of the Z and R* product over, and bounded by, a single Walsh period. This summation operation must be bounded at the Walsh period boundaries or interference from adjacent CDMA channels will occur. The output of block 64 then, is that portion of the numerator of the code domain power equation that exists between absolute value signs. The output of summer 64, still represented by I and Q values, is input to block 68 which performs an absolute value and squaring operation. The output of block 68 then, represents that portion of the numerator of the code domain power equation that is squared. The output of block 68 is input to block 72. Block 72 functions as the summer which sums over N in the numerator of the code domain power equation. IS-97 specifies that N have a minimum value of 20, but in the preferred embodiment of the present invention being set forth the value of N is 256.

The output of block 72 represents the entire numerator of the code domain power equation. This numerator value is output from block 72 and input to memory 76. Memory 76 is a conventional random access memory which can be accessed by processor 90. Memory 76 also has as inputs other values that will now be discussed.

The output of chip timing recovery circuit 46, which represents Z, is input to block 62 where it is squared. The output of squaring block 62 is then input to summer block 66, where a summation is performed over, and on the boundaries of, the same Walsh period that was summed over in block 64. The output of block 66 is then input to summer block 74 which sums over a plurality of Walsh periods and is controlled in a like manner to that of summer block 72. Again, in the preferred embodiment being set forth the sum is performed over 256 Walsh periods. The output of block 74 represents that portion of the denominator of the code domain power equation which is a function of Z. The remainder of the denominator of the code domain power equation, which is a function strictly of R, is reduced to a known constant because R, the output of reference generator 78 consists of positive 1's and negative 1's, which when squared yield the value of 1. This simplification of the denominator as a result of the reference generator design provides a significant savings in hardware required to perform the waveform quality parameter measurements.

The output of block 64, which represents the correlation of Z and R* over 64 chip periods, is input to summer 70, which is identical in function to summers 72 and 74. Summer 70 can sum over any number of Walsh integrations but in the preferred embodiment being set forth, summer 70 sums over 256 Walsh periods. The output of block 70 is then input to memory 76 for later retrieval by processor 90.

The present invention recognizes that the output of block 64 can be interpreted in polar coordinates as represented by a magnitude and a phase. The present invention further recognizes that when summed over a plurality of Walsh periods as summer 70 performs, the phase measurement can be made more accurate. It is this accurate phase measurement output by block 70 and input to memory 76 that is used in the determination of the waveform quality parameters, as will be described in detail hereinafter.

The contents of memory 76 as read by processor 90 are used in the calculation of the waveform quality parameters. The numerator and the non-constant portion of the denominator of the code domain power equation reside in memory 76. In addition, an accurate phase value corresponding to the phase of Z as output from chip timing recovery circuit 46 is stored in memory 76. The values of these intermediate variables stored in memory 76 reflect the effects of the coarse timing control word which is input to memory 44, the fine timing control which is input to chip timing recovery circuit 46, the Walsh channel selection and PN offset selection which are both input to reference generator 78, and the number of Walsh integrations input to summers 70, 72, and 74.

Figure 3:
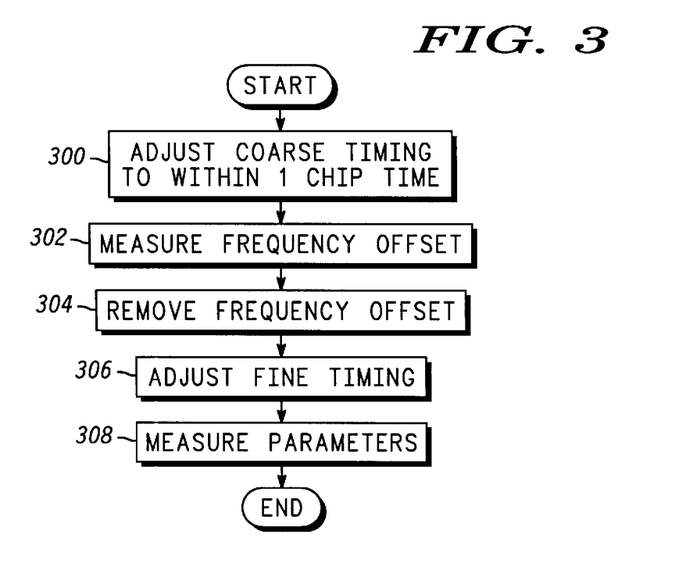
FIG. 3 shows a flow diagram illustrating the steps necessary before measuring code domain parameters in accordance with one aspect of the present invention.

Referring now to FIG. 3, a flowchart is shown that illustrates the required sequence of events to achieve proper timing before measuring waveform quality parameters. The steps in FIG. 3 assume that memory 44 has baseband I and Q samples stored at two samples per chip. Further, FIG. 3 assumes that memory 44 has the ability to output the I and Q baseband samples an indeterminate number of times. Step 300 has as its purpose to adjust the coarse timing. The coarse timing of more than one chip time is determined by looking at the correlation between the reference and composite CDMA input signal. The reference signal is time shifted one chip at a time until the correlation process indicates that the reference and composite input signal are timed within one chip period. This correlation value corresponds to the ratio of the numerator and the denominator of the code domain power equation as stored in memory 76. After step 300 is complete, step 302 is performed which measures the frequency offset of the input composite CDMA signal. In the preferred embodiment of the present invention, it is necessary to have frequency offset of less than or equal to 200 Hz in order to meet the measurement accuracy as specified in IS-97. Step 302 measuring frequency offset, is shown in more detail in FIG. 4.

Figure 4:
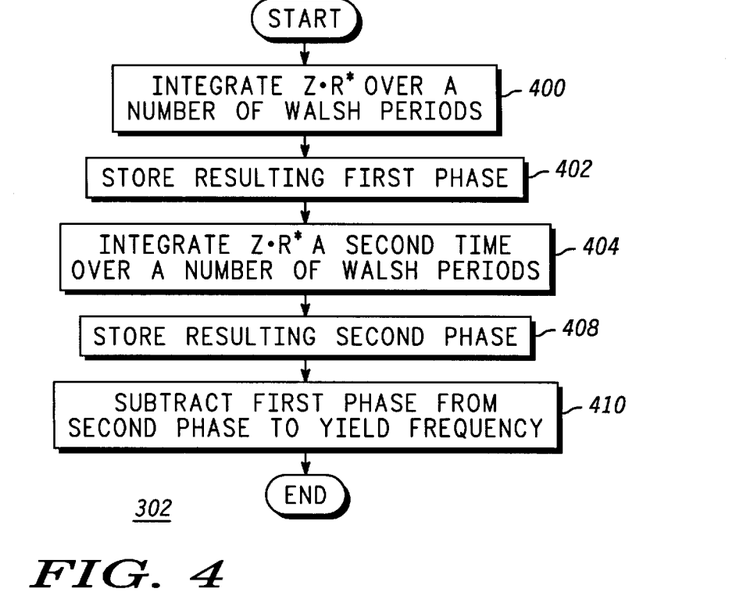
FIG. 4 shows a flow diagram of a method for determining frequency offset in accordance with one aspect of the present invention.

FIG. 4 shows the calculation of the frequency offset and illustrates how the accurate phase value as output from block 70 and stored in memory 76 is utilized. Because the present invention is capable of utilizing the information stored in memory 44 multiple times, phase measurements can be made more than once and at different points in the sample sequence that represent different points in time, resulting in two distinct phase values which, when subtracted, yield frequency offset. Step 400 corresponds to the first phase measurement at the first time in the sample sequence. The product of Z and R* is integrated over a plurality of Walsh periods. After the integration in step 400 the first phase value is stored in memory 76 in step 402. Then, in step 404, a second integration of the product of Z and R* is performed over a sequence of samples that represent a later point in time. Then, in step 408, the second phase value is stored in memory 76. Now, having both first and second phase values stored in memory 76, and having information regarding the time difference of the two phase measurements, processor 90 can determine frequency offset by taking the difference between the two values as shown in step 410.

Referring back to FIG. 3, if the frequency offset as found in step 302 is greater than or equal to 200 Hz, then this frequency offset will be removed in step 304. Processor 90 can remove the frequency offset from samples contained in memory 44 using well-known techniques. Processor 90 can multiply the sample stream contained in memory 44 by a complex rotating phasor that represents the frequency offset to be removed. Of course, other conventional techniques for frequency removal are contemplated, such as an additional complex LO and multiplier implemented in hardware (not shown). In general, frequency translation techniques for use with complex samples are well known in the art. After the frequency offset has been removed in step 304, the fine timing is adjusted in step 306. Step 306 is shown more fully in FIG. 5.

Figure 5:
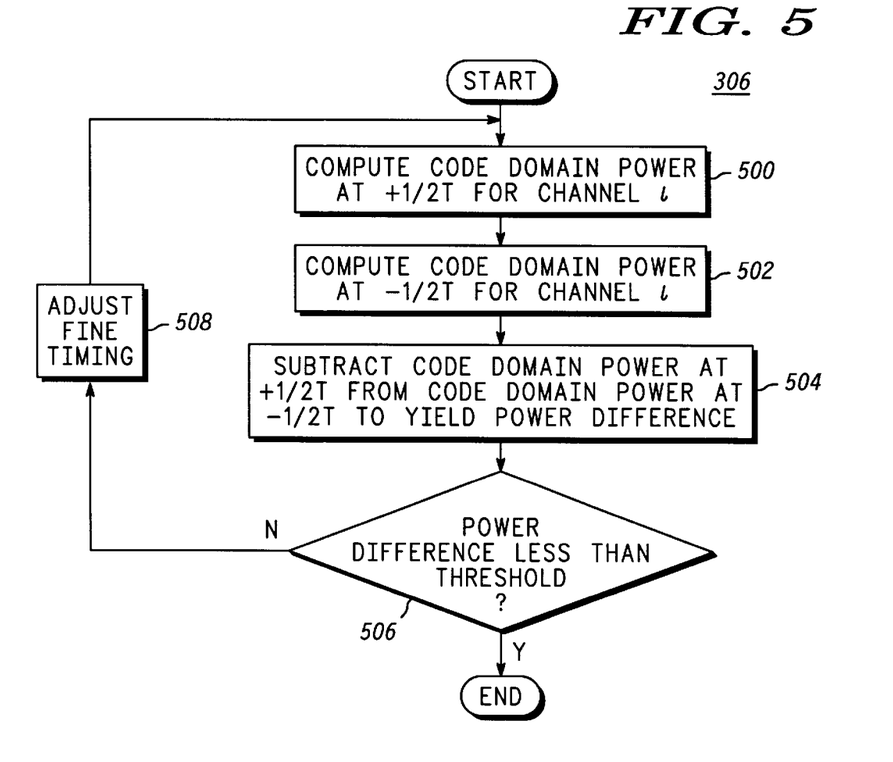
FIG. 5 shows a flow diagram of a method for determining fine timing for a code channel in accordance with one aspect of the present invention.

Referring now to FIG. 5, a flow diagram illustrating the steps used in the fine timing determination is shown. Steps 500 and 502 compute code domain power at plus ½ chip and minus ½ chip, respectively. Step 504 subtracts the code domain power measured at plus ½ chip from the code-domain power measured at minus ½ chip to yield a power difference. This calculation takes advantage of the fact that if the samples are properly timed the power at plus ½ chip and the power at minus ½ chip will be equal. If the power values are not equal then a timing modification may possibly be made. In step 506 the power difference is compared to a threshold. If the power difference is greater than a threshold, indicating a timing offset that is too large, fine timing is adjusted in step 508. The fine timing is adjusted by modifying the fine timing control which is an input to chip timing recovery circuit 46. As shown in FIG. 5, the timing adjustment is an iterative process and continues until the power difference is less than the threshold. Once the power difference found is less than the threshold, the fine timing has been found. It should be noted that the algorithm shown in FIG. 5 is valid for acquiring timing of any channel including channel 0 (pilot channel) and channels 1–63 (code channels). After fine timing is adjusted in step 306 the parameters can be measured in step 308. The timing found in step 306 when i is equal to 0 is the pilot timing offset, $\tau_0$, which is measured relative to the two second reference timing reference put out by the base station.

Figure 6:
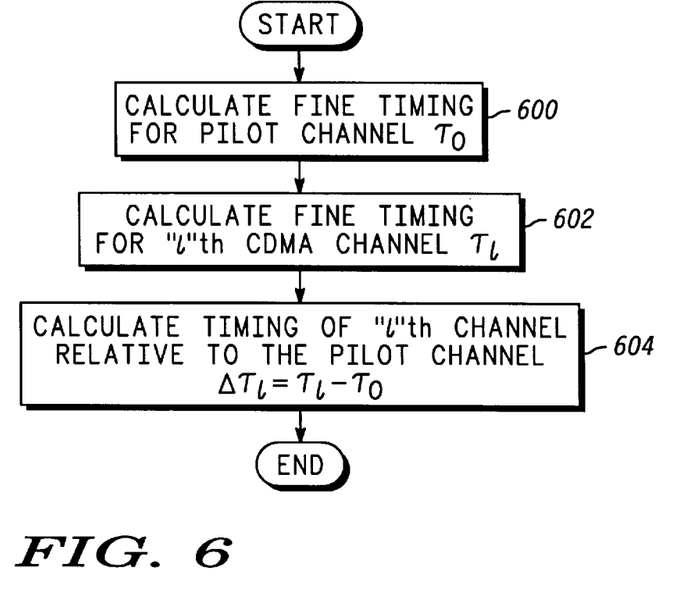
FIG. 6 shows a flow diagram of a method for determining the timing of a code channel relative to that of the pilot channel in accordance with one aspect of the present invention.

FIG. 6 shows the method used for measuring the timing of the 63 non-pilot channels relative to the pilot channel, $\Delta\tau_i$. Step 600 calculates fine timing for the pilot channel, $\tau_0$, which is equivalent to executing the steps in FIG. 5 with i=0. Step 602 comprises the step of determining the fine timing of CDMA channel i, $\tau_i$, which is equivalent to the algorithm in FIG. 5 with i equal to the channel of interest. Step 604 shows the calculation of the timing of CDMA channel i relative to the pilot channel which is the difference between the previous two measurements. The timing of all 63 non-pilot channels relative to the pilot channel are measured in this manner.

Figure 7:
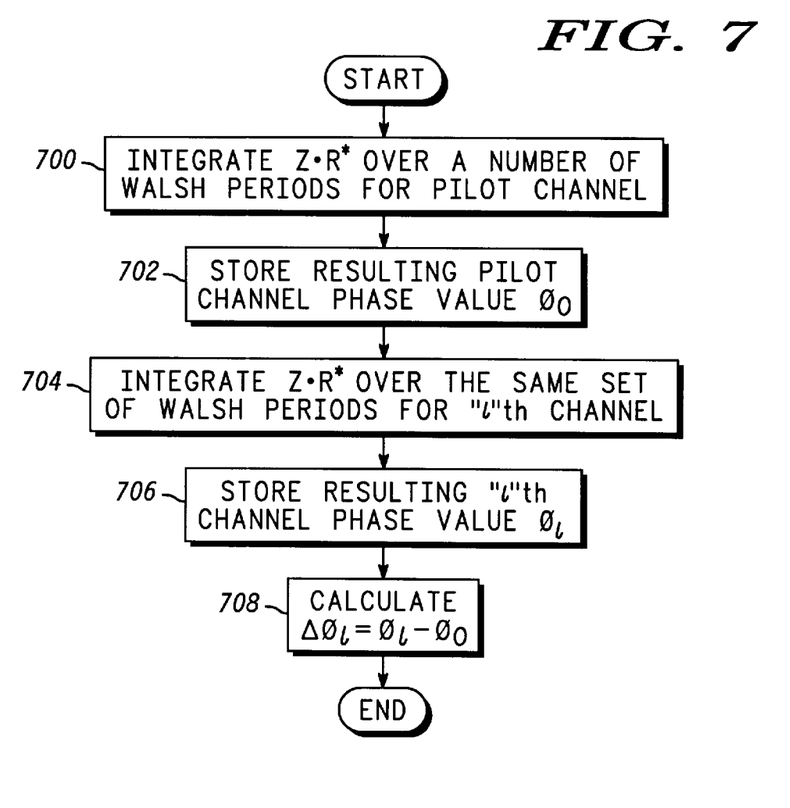
FIG. 7 shows a flow diagram of a method for determining the phase of a code channel relative to that of the pilot channel in accordance with one aspect of the present invention.

FIG. 7 shows the method used to measure the phase of the 63 non-pilot channels with respect to the pilot channel, $\Delta\phi_i$. All measurements shown in FIG. 7 are performed with sample timing as found with the pilot channel. In step 700 the correlation of the reference and the composite input signal are integrated over a plurality of Walsh periods for the pilot channel. In step 702, the resulting pilot channel phase value $\phi_0$ is stored in memory 76. In step 704, the correlation of the reference signal R* with the composite input signal Z for channel i are integrated over the same set of Walsh periods. In step 706, the resulting phase value for channel i, $\phi_i$ is stored in memory 76. The phase difference is then calculated in step 708 as the difference between the phase of channel i and the phase of the pilot channel. The method of FIG. 7 is repeated 63 times for the measurement of the 63 non-pilot channels.

The numerator of the code domain power equation includes a squared term that is the absolute value of the summation over one Walsh period of the correlation between Z and R*. It has been recognized that more accuracy can be brought into the measurement process by increasing the summation length inside the absolute value so that k, instead of taking on values from 1 to 64, would take on values from 1 to m, where m=64n, as follows:

$$\left| \sum_{k=1}^{m} Z_{j,k} R^*_{i,j,k} \right| \qquad \text{Equation 1.}$$

Two problems arise when increasing the length of the summation to greater than a Walsh period, or 64 chips. Data symbols must be present in the reference in order for the correlation to be coherent across symbol boundaries. For instance, if Z contained two symbols, a 1 and a −1, but the reference contained no data, the summation over the two symbols, if no other errors were introduced, would be zero. Another problem arising from the increased summation interval is one of frequency tolerance. It is known that to make a measurement over one Walsh period, a frequency offset of no more than around 200 Hz can be tolerated. This is dictated by the amount of tolerable phase change over one measurement period, in this case, being one Walsh period. When the measurement period is increased from one Walsh period to many Walsh periods, the maximum tolerable phase change over the measurement period does not change, thereby decreasing the amount of tolerable frequency offset.

The present invention solves both of these problems. The summation interval can be increased without bound, while not requiring data to be present in the reference waveform and also not requiring a tighter frequency offset tolerance than that which is required for the integration over one Walsh period, or about 200 Hz.

The present invention realizes that the equation with the increased correlation time is equivalent to the following:

$$\sum_{j=1}^{n} \left| \sum_{k=1}^{64} Z_{j,k} R^*_{i,j,k} \right| \qquad \text{Equation 2.}$$

where n=m/64, the inner summation is over, and bounded by, one Walsh period, and the inner summation has the correct sign. By breaking the increased summation interval into multiples of symbol times as defined by the Walsh periods, the significance of the data has been removed. In addition, since each inner summation is only over one Walsh period, the tolerable frequency offset remains at about 200 Hz.

Figure 8:
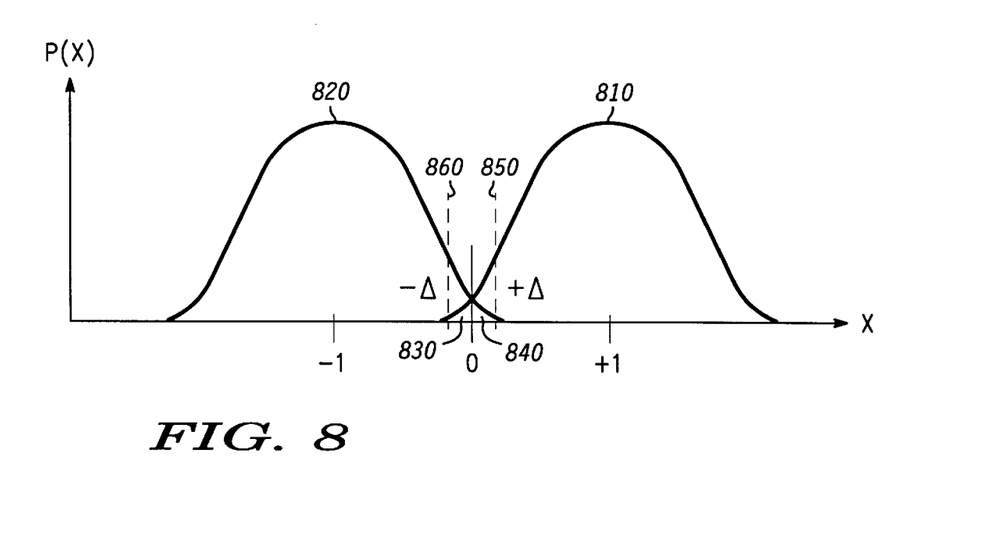
FIG. 8 shows two probability density functions that result from a summation in accordance with one aspect of the present invention.

It is recognized that this approach is not error free. Over any one symbol, there exists a probability that the summation over the Walsh period will be equal to +1, −1, or any value distributed thereabout. This is shown in FIG. 8 where two exemplary probability density functions (PDF) are shown. Referring now to FIG. 8, PDF 810 shows the possible result of correlating over one Walsh period when the actual data is equal to +1. Over most of the area contained under PDF 810, the result of equation 2 is the same as equation 1 because the absolute value operation over the Walsh period will preserve the correct sign, and therefore, no error will be introduced. The area 830, however, represents an area where equation 2 would contribute an error because the symbol was a +1 and the absolute value operation would report the incorrect sign. Likewise, PDF 820 shows the possible result of correlating over one Walsh period when the actual data is equal to −1. There is also a corresponding area 840 where an error can be contributed.

It has been found that these errors can essentially be removed by not including results from the inner summation of equation 2 that are close to zero. In FIG. 8 there are shown two delta values, a positive delta 850 and a negative delta 860, the range between them being termed a possible error range. The delta values 850 and 860 are defined such that if the inner summation over a Walsh period produces a result within the area bounded by the delta values, it is not included in the outer summation. When the delta values are defined such that the majority of the error areas 830 and 840 are between them, and are not included in the larger summation of equation 2, the error is essentially removed and the benefits of the increased summation interval are realized.

Figure 9:
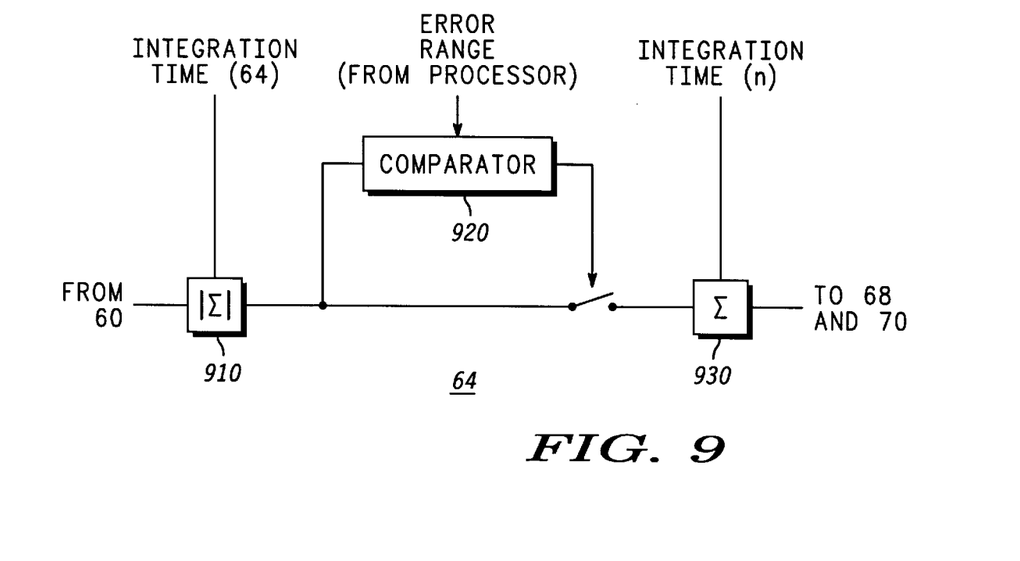
FIG. 9 shows a circuit used to reduce errors while increasing accuracy in accordance with one aspect of the present invention.

FIG. 9 shows a circuit representing the details of summer 64, which is capable of performing the steps as outlined in the previous paragraph. This detail of summer 64 is implemented in one embodiment of the invention, that embodiment being the one which desires to minimize the error while increasing the measurement accuracy through a corresponding increase in correlation length.

In FIG. 9, summer 910 performs the sum over a single Walsh period and then performs an absolute value function. Comparator 920 compares the output of summer 910 with an error range provided by processor 90. This error range corresponds to the region between the positive delta and the negative delta as shown in FIG. 8. The output of summer 910 is then conditionally included in the outer sum of summer 930. The error range may be defined arbitrarily small so that all absolute values from summer 910 are included in the sum performed by summer 930.

The present invention, in many of its attendant advantages will be understood from the foregoing description and it will be apparent that various changes may be made in the form, construction, and the arrangement of the parts, without departing from the spirit and scope of the invention, or sacrificing all of their material advantages, the form herein being merely a preferred or exemplary embodiment thereof.

Accordingly, it is intended that the appended claims cover all modifications of the invention which fall within the true spirit and scope of the invention.

What is claimed is:

1. An apparatus, responsive to a code division multiple access (CDMA) signal for determining signal quality of the CDMA signal, comprising:

circuit means for determining a correlation function of the CDMA signal and a reference signal over at least one Walsh code period for each of a plurality of Walsh code channels, wherein said reference signal consists solely of either +1 or −1 digital values thereby simplifying overall hardware and operations, wherein said circuit means includes:

means for determining a summation of a magnitude squared of said correlation function of the CDMA signal and said reference signal for each Walsh code channel over at least one Walsh code period; and means for determining a summation of a magnitude squared of the CDMA signal; and parameter determining means, responsive to said correlation function, for determining at least one parameter of the CDMA signal.

2. The apparatus of claim 1 wherein said parameter determining means includes means for determining a pilot timing relative to a CDMA base station timing reference.

3. The apparatus of claim 2 wherein said means for determining said pilot timing includes:

means for determining a first pilot channel code domain power at a positive time distance of one half chip time from a current sample time;

means for determining a second pilot channel code domain power at a negative time distance of one half chip time from said current sample time;

means for determining a difference between said first pilot channel code domain power and said second pilot channel code domain power;

in response to said difference, means for adjusting said current sample time; and means for determining said pilot timing as a difference between said current sample time and said CDMA base station timing reference.

4. The apparatus of claim 1 wherein said parameter determining means includes means for determining a timing offset of each of said plurality of Walsh code channels relative to a pilot timing.

5. The apparatus of claim 4 wherein said means for determining said timing offset includes:

means for determining said pilot timing;

means for determining a first code channel code domain power at a positive time distance of one half chip time from a current sample time;

means for determining a second code channel code domain power at a negative time distance of one half chip time from said current sample time;

means for determining a difference between said first code channel code domain power and said second code channel code domain power;

in response to said difference, means for adjusting said current sample time;

means for determining a code timing as a difference between said current sample time and a CDMA base station timing reference; and means for determining said timing offset as a difference between said code timing and said pilot timing.

6. The apparatus of claim 1 wherein said parameter determining means includes means for determining a phase of a pilot channel.

7. The apparatus of claim 6 wherein said means for determining said phase of said pilot channel includes:

means for performing said correlation function over at least one Walsh code period to produce a magnitude and said phase of said pilot channel.

8. The apparatus of claim 1 wherein said parameter determining means includes means for determining a phase offset for each of said plurality of Walsh code channels relative to a phase of a pilot channel.

9. The apparatus of claim 8 wherein said means for determining said phase offset includes:

means for determining said phase of said pilot channel over at least one Walsh code period;

means for performing said correlation function over said at least one Walsh code period to produce a Walsh code channel magnitude and a Walsh code channel phase; and means for determining said phase offset as a difference between said Walsh code channel phase and said phase of said pilot channel.

10. The apparatus of claim 1 wherein said parameter determining means includes means for determining a frequency error of the CDMA signal by determining a phase difference of a Walsh code channel at two different times.

11. The apparatus of claim 10 wherein said means for determining said frequency error includes:

means for performing said correlation function at a first time over at least one Walsh code period to produce a first Walsh code channel magnitude and a first Walsh code channel phase;

means for performing said correlation function at a second time over at least one Walsh code period to produce a second Walsh code channel magnitude and a second Walsh code channel phase; and means for determining said frequency error as a delta phase divided by a delta time, said delta phase being said first Walsh code channel phase subtracted from said second Walsh code channel phase, and said delta time being said first time subtracted from said second time.

12. The apparatus of claim 11 wherein said Walsh code channel is a pilot channel.

13. The apparatus of claim 11 wherein said Walsh code channel is a non-pilot channel.

14. The apparatus of claim 1 wherein said parameter determining means includes determining a code domain power for at least one of said plurality of Walsh code channels, and wherein a power value for said reference signal is a constant.

15. The apparatus of claim 1 wherein said circuit means includes:

means for buffering and repeatedly outputting said CDMA signal an indeterminate number of times with a time offset, said means for buffering and replaying said CDMA signal being responsive to a coarse timing control word.

16. The apparatus of claim 15 wherein said circuit means includes:

means for chip timing recovery, said means for chip timing recovery being responsive to a fine timing control word.

17. The apparatus of claim 16 wherein said circuit means includes:
processing means for control of said coarse timing control word and said fine timing control word, said processing means being responsive to said summation of said magnitude squared of said correlation function.

18. The apparatus of claim 17 wherein said processing means is also responsive to said summation of said magnitude squared of said CDMA signal.

19. A method for increasing accuracy of CDMA waveform quality measurements of a CDMA waveform comprising the steps of:
providing a reference signal;
determining a correlation between said CDMA waveform and said reference signal, wherein said step of determining a correlation is performed over a plurality of Walsh periods to form a plurality of Walsh period correlation values, each of said plurality of Walsh period correlation values corresponding to a correlation over one Walsh period
determining a plurality of absolute values of said plurality of Walsh period correlation values, wherein each of said plurality of absolute values corresponds to one of said plurality of Walsh period correlation values; and
determining a sum of a portion of said plurality of absolute values.

20. The method of claim 19 wherein said reference signal consists of binary values representing positive 1s and negative 1s.

21. The method of claim 19 wherein said step of determining a sum includes summing all of said plurality of absolute values.

22. The method of claim 19 wherein said step of determining a sum includes:
defining an error range; and
summing a portion of said plurality of absolute values that are outside said error range.

23. An apparatus for increasing the measurement accuracy of CDMA waveform quality measurements comprising:
multiplying means for generating a correlation between a CDMA signal and a reference signal;
means for determining a sum of said correlation over each of a plurality of Walsh periods to produce a plurality of Walsh period correlation values;
means for determining a plurality of absolute values of said plurality of Walsh period correlation values, wherein each of said plurality of absolute values corresponds to one of said plurality of Walsh period correlation values; and
means for determining a sum of a number of said plurality of absolute values.

24. The apparatus of claim 23 wherein said reference signal is comprised of binary values.

25. The apparatus of claim 23 wherein said reference signal consists of binary values.

26. The apparatus of claim 23 wherein said multiplying means comprises circuit means, responsive to said reference signal, for conditional negation of said CDMA signal.

27. The apparatus of claim 23 wherein said means for determining a sum of a number of said plurality of absolute values is comprised of:
means for summing all of said plurality of absolute values.

28. The apparatus of claim 23 wherein said means for determining a sum of a number of said plurality of absolute values is comprised of:
means for defining an error range; and
means for summing a portion of said plurality of absolute values that are outside said error range.

29. An apparatus, responsive to a code division multiple access (CDMA) signal for determining signal quality of the CDMA signal, comprising:
circuit means for determining a correlation function of the CDMA signal and a reference signal over at least one Walsh code period for each of a plurality of Walsh code channels; and
parameter determining means, responsive to said correlation function, for determining at least one parameter of the CDMA signal, wherein said parameter determining means includes means for determining a pilot timing relative to a CDMA base station timing reference, and wherein said means for determining said pilot timing includes:
means for determining a first pilot channel code domain power at a positive time distance of one half chip time from a current sample time;
means for determining a second pilot channel code domain power at a negative time distance of one half chip time from said current sample time;
means for determining a difference between said first pilot channel code domain power and said second pilot channel code domain power;
in response to said difference, means for adjusting said current sample time; and
means for determining said pilot timing as a difference between said current sample time and said CDMA base station timing reference.

30. An apparatus, responsive to a code division multiple access (CDMA) signal for determining signal quality of the CDMA signal, comprising:
circuit means for determining a correlation function of the CDMA signal and a reference signal over at least one Walsh code period for each of a plurality of Walsh code channels; and
parameter determining means, responsive to said correlation function, for determining at least one parameter of the CDMA signal, wherein said parameter determining means includes means for determining a timing offset of each of said plurality of Walsh code channels relative to a pilot timing, and wherein said means for determining said timing offset includes:
means for determining said pilot timing;
means for determining a first code channel code domain power at a positive time distance of one half chip time from a current sample time;
means for determining a second code channel code domain power at a negative time distance of one half chip time from said current sample time;
means for determining a difference between said first code channel code domain power and said second code channel code domain power;
in response to said difference, means for adjusting said current sample time;
means for determining a code timing as a difference between said current sample time and a CDMA base station timing reference; and
means for determining said timing offset as a difference between said code timing and said pilot timing.

31. An apparatus, responsive to a code division multiple access (CDMA) signal for determining signal quality of the CDMA signal, comprising:
circuit means for determining a correlation function of the CDMA signal and a reference signal over at least one Walsh code period for each of a plurality of Walsh code channels; and parameter determining means, responsive to said correlation function, for determining at least one parameter of the CDMA signal, wherein said parameter determining means includes means for determining a phase offset for each of said plurality of Walsh code channels relative to a phase of a pilot channel, and wherein said means for determining said phase offset includes:

means for determining said phase of said pilot channel over at least one Walsh code period;

means for performing said correlation function over said at least one Walsh code period to produce a Walsh code channel magnitude and a Walsh code channel phase; and means for determining said phase offset as a difference between said Walsh code channel phase and said phase of said pilot channel.

32. An apparatus, responsive to a code division multiple access (CDMA) signal for determining signal quality of the CDMA signal, comprising:

circuit means for determining a correlation function of the CDMA signal and a reference signal over at least one Walsh code period for each of a plurality of Walsh code channels; and parameter determining means, responsive to said correlation function, for determining at least one parameter of the CDMA signal, wherein said parameter determining means includes means for determining a frequency error of the CDMA signal by determining a phase difference of a Walsh code channel at two different times, and wherein said means for determining said frequency error includes:

means for performing said correlation function at a first time over at least one Walsh code period to produce a first Walsh code channel magnitude and a first Walsh code channel phase;

means for performing said correlation function at a second time over at least one Walsh code period to produce a second Walsh code channel magnitude and a second Walsh code channel phase; and means for determining said frequency error as a delta phase divided by a delta time, said delta phase being said first Walsh code channel phase subtracted from said second Walsh code channel phase, and said delta time being said first time subtracted from said second time.

33. The apparatus of claim 32 wherein said Walsh code channel is a pilot channel.

34. The apparatus of claim 32 wherein said Walsh code channel is a non-pilot channel.

35. An apparatus, responsive to a code division multiple access (CDMA) signal for determining signal quality of the CDMA signal, comprising:

circuit means for determining a correlation function of the CDMA signal and a reference signal over at least one Walsh code period for each of a plurality of Walsh code channels; and parameter determining means, responsive to said correlation function, for determining at least one parameter of the CDMA signal;

wherein said circuit means includes:

means for determining a summation of a magnitude squared of said correlation function of the CDMA signal and said reference signal for each Walsh code channel over at least one Walsh code period; and means for determining a summation of a magnitude squared of the CDMA signal.

36. The apparatus of claim 35 wherein said circuit means includes:

means for buffering and repeatedly outputting said CDMA signal an indeterminate number of times with a time offset, said means for buffering and replaying said CDMA signal being responsive to a coarse timing control word.

37. The apparatus of claim 36 wherein said circuit means includes:

means for chip timing recovery, said means for chip timing recovery being responsive to a fine timing control word.

38. The apparatus of claim 37 wherein said circuit means includes:

processing means for control of said coarse timing control word and said fine timing control word, said processing means being responsive to said summation of said magnitude squared of said correlation function.

39. The apparatus of claim 38 wherein said processing means is also responsive to said summation of said magnitude squared of said CDMA signal.

* * * * *